United States Patent [19]

Hanada

[11] 4,024,993

[45] May 24, 1977

[54] TONER-REPLENISHING APPARATUS FOR USE IN DRY PROCESS ELECTROSTATIC COPIER

[75] Inventor: Yoshihiro Hanada, Toyokawa, Japan

[73] Assignee: Minolta Camera Kabushiki Kaisha, Osaka, Japan

[22] Filed: Jan. 28, 1975

[21] Appl. No.: 544,723

[30] Foreign Application Priority Data

Feb. 7, 1974 Japan .............................. 49-15749

[52] U.S. Cl. ................................ 222/272; 222/406; 222/414; 222/DIG. 1; 259/45

[51] Int. Cl.[2] ........................................ G01F 11/24

[58] Field of Search .......... 222/228, 235, 238, 342, 222/406, 414, 330, 280, 281, 410, 272, DIG. 1; 259/40–42, 45

[56] References Cited

UNITED STATES PATENTS

| | | | |
|---|---|---|---|
| 633,555 | 9/1899 | Mitchell et al. | 222/410 X |
| 2,530,406 | 11/1950 | Singletary | 222/414 X |
| 2,753,085 | 7/1956 | Plummer | 222/281 X |
| 2,907,499 | 10/1959 | Agronin | 222/281 X |
| 3,149,760 | 9/1964 | Eichorn et al. | 222/406 X |
| 3,374,768 | 3/1968 | Lawes et al. | 222/DIG. 1 X |
| 3,386,416 | 6/1968 | Wirth | 222/414 X |
| 3,525,410 | 8/1970 | Focke | 222/414 X |
| 3,608,792 | 9/1971 | Hudson | 222/DIG. 1 X |
| R20,572 | 12/1937 | Litty et al. | 222/281 X |

FOREIGN PATENTS OR APPLICATIONS

| | | | |
|---|---|---|---|
| 1,493,649 | 7/1967 | France | 222/414 |
| 690,456 | 6/1930 | France | 222/414 |

OTHER PUBLICATIONS

T880,009, Nov. 24, 1970, Harris, 222/414 X.

*Primary Examiner*—Drayton E. Hoffman
*Assistant Examiner*—Charles A. Marmor
*Attorney, Agent, or Firm*—Wolder & Gross

[57] ABSTRACT

Steady flow of dry toner from the discharge outlet of a toner tank is produced by inducing vortex-like motion of toner within the tank to inhibit toner bridging. A rotating brush associated with the discharge outlet has a rim in grazing contact with an edge of a fixed, inclined plate to establish the toner motion. In a preferred form of toner-supplying device, two discharge outlets are used, each associated with a brush/plate set.

1 Claim, 1 Drawing Figure

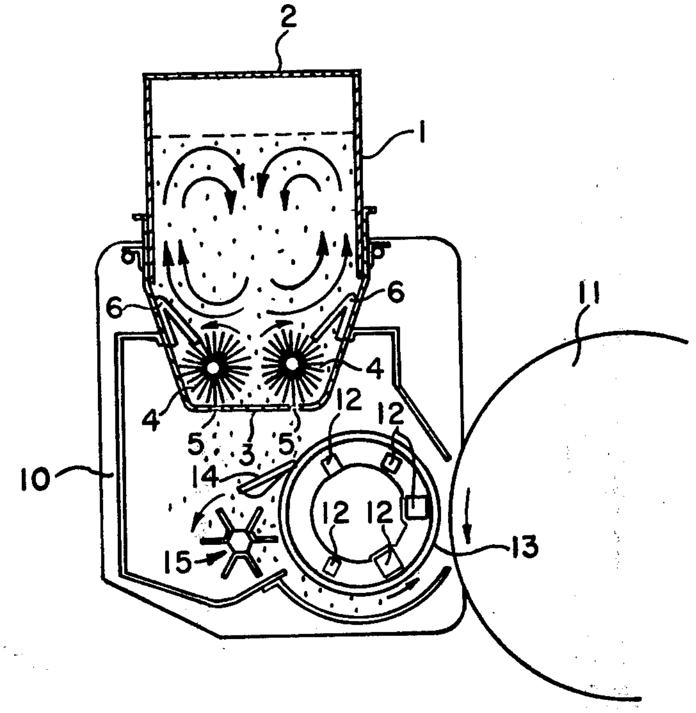
2
1
6
6
11
4
4
12
12
5
3
5
10
14
12
12
13
15

TONER-REPLENISHING APPARATUS FOR USE IN DRY PROCESS ELECTROSTATIC COPIER

BACKGROUND OF THE INVENTION

1. Field of the Invention

This invention relates to a toner-replenishing apparatus usable in a dry process electrostatic copier and particularly relates to a toner supply device that supplies dry toner at a uniform rate. Even more particularly, it relates to a supply device of the type comprised of a toner tank having a discharge outlet in the bottom thereof and a toner-dispensing rotary brush disposed in the tank in sliding contact with said outlet. The tank holds a large quantity of toner and an appropriate amount of this toner is supplied to a conventional developing unit by operation of the brush through suitable drive means.

2. Discussion of the Prior Art

Dry toner contained in the supply tank of a toner-supplying device has inherent viscosity which can, under adverse conditions, cause lumps to form in the mass of toner, leading to cavities beneath the lumps in the toner mass as toner is dispensed. In other words, it can cause a bridging phenomenon to occur, thereby impairing performance of the toner-supplying function of the tank. To avoid such bridging, in the past there have been provided means (i.e., mechanism) for shaking the toner tank itself or an agitating device has been disposed inside the tank for mechanically stirring the toner mass. Each of these countermeasures against toner bridging requires a specific mechanism to drive the tank-moving means or the agitating device, hence any apparatus including such a mechanism becomes bulky and complicated in construction.

SUMMARY OF THE INVENTION

In view of the above-mentioned deficiencies of the known art, it is a primary object of the present invention to provide a simple toner-supplying device which insures steady reduction in amount of toner in the tank commensurate with the consumption of toner by the associated apparatus (i.e., during the development of a dry-toned image on a photosensitive drum).

It is a further object of the present invention to provide a toner-supplying device which avoids the above-described bridging phenomenon (i.e., cavities), the device being characterized by simple coaction of a stationary control plate and a rotating toner-dispensing brush.

The invention resides in an improved toner-replenishing apparatus of the type having a tank containing a quantity of dry toner. A toner-discharging outlet is located in the tank bottom and a rotatable brush disposed within the tank above and near the outlet. The brush has a rim and is rotated by suitable drive means. A plate fixed within the tank has an edge that contacts a portion of the brush's rim, coacting with the rotating brush to induce a flow of toner in the tank in a desired path, whereby toner flows at a steady rate from the outlet as the brush rotates and its interaction with the plate causes circulation of toner in the tank.

BRIEF DESCRIPTION OF THE DRAWING

The present invention will be described with reference to the appended drawing, which shows a cross-sectional view of a preferred embodiment of the invention.

DESCRIPTION OF THE PREFERRED EMBODIMENT

In the embodiment shown in the FIGURE, a toner tank 1 has a cover 2 that is adapted to open and close. A pair of tonerdispensing rotary brushes 4 slidably contact bottom 3 of tank 1. The brushes 4 are driven in a fashion described subsequently. Toner-discharging outlets 5 of a slit-shaped configuration are situated in bottom 3 at locations where each outlet is contacted by the bottom of a respective brush 4. Stationary control plates 6, provided in the tank in accordance with the present invention, extend lengthwise in the axial direction of the related brush 4 and widthwise extend in the radial direction with respect to the respective brush 4. Furthermore, still considering the width, while one side of each plate 6 extends radially relative to its adjacent brush 4 with the edge thereof lightly engaging the rim of such brush, the other side of each plate 6 is fixedly secured to a side wall of tank 1.

A developing means 10 disposed below tank 1 is comprised of (a) a rotating nonmagnetic sleeve 13, (b) a plurality of fixed magnets 12 disposed inside sleeve 13 on a circular support (not numbered), and adapted to form a magnetic brush on sleeve 13 with developing agent (not specifically shown in the FIGURE) in know fashion, (c) a photosensitive (i.e., electrophotographic) drum 11 on which latent electrostatic images are developed by means of sleeve 13 and magnets 12, (d) a scraper blade 14 for removing developing agent which remains on sleeve 13 after an image on drum 11 has been developed, and (e) an agitating wheel 15 for mixing the toner supplied from tank 1 into the developing agent, all as shown in the drawing. Sleeve 13 and wheel 15 are rotated by means of drive motors (not shown) in directions indicated by respective rotation arrows in the drawing. Brushes 4 are rotated because the rotating movement of sleeve 13 or wheel 15 is transmitted thereto through rotation-transmitting means such as gears or the like.

The operation of the toner-supplying device of the abovedescribed arrangement will now be described in greater detail. For starting the developing operation, wheel 15 and 13 are set into motion, their rotation being transmitted to brushes 4 by the aforementioned rotation-transmitting means. Brushes 4 are driven in opposite directions, as indicated by respective rotation arrows in the drawing, causing toner to divide — with the aid of control plates 6 — into (a) a mass to be supplied to developing means 10 through discharge openings (outlets) 5 and (b) a mass which moves along plates 6 toward the respective sidewalls of tank 1 and then upward along those walls, a toner mass in the upper central portion of tank 1 moving downward to accommodate the upward movement of the mass along each plate 6. Hence, a vortex-like movement of toner is created in tank 1.

The coaction of brushes 4 and plates 6 creates the vortexlike movement of toner, but due to nonfluidity of the toner, the resulting vortex pattern of toner flow R spreads throughout the tank as indicated by further curved arrows representing auxiliary toner flow in the tank, thus preventing the unwanted bridging phenomenon from taking place.

Although the embodiment shown includes two stationary control plate and rotating toner-dispensing brush sets with opposite rotation of the brushes for forming vortex-like movement of toner mass in two different locations, it should be understood that the number of sets can be varied (higher or lower), depending on the desired vortex-like movement of toner.

An experiment performed by the inventor of the present invention reveals that when brushes 4 are rotated at 15 revolutions per minute, the above-described vortex-like movement of toner is produced and acts to prevent the formation of lumps and cavities within the toner mass — which would give rise to the bridging phenomenon. As a result, a steady or uniform rate of decrease in the amount of toner in tank 1 is achieved.

As is evident, therefore, the toner-supplying device of the present invention produces vortex-like movement of toner by simple provision of a stationary control plate 6 which slidably and lightly contacts a toner-dispensing rotary brush 4 to produce consistent (i.e., uniform) rate of decrease in toner in the tank 1, discharge of toner from the outlet(s) 5 of the tank being at a correspondingly uniform rate, whereby a consistent and stable supplying function is effectively achieved. Moreover, the construction of the apparatus designed for this purpose is simple and its overall dimensions are not materially increased.

Although the foregoing specification described a particular embodiment including possible variations, modifications of the basic invention other than those mentioned will be evident to those skilled in the art. The embodiment described is therefore to be considered as merely exemplary, the intent being that the spirit and scope of the invention be limited only by the appended claims.

What is claimed is:

1. A toner replenishing apparatus for use in dry process electrostatic copier which comprises: a tank containing a quantity of dry toner and having side walls and a bottom portion provided with a plurality of toner discharging outlets, a pair of transversely spaced apart rotatable brushes formed of pluralities of bristle members and having peripheries defined by the terminal portions of said bristle members and disposed parallel to said tank bottom portion with said bristle members in contact with said outlets, means for rotating said brushes in relatively opposite directions with their confronting faces advancing upwardly, a pair of plates disposed at the upper portions of the brushes and having the outer edges thereof affixed to said tank side walls and the inner edges thereof projecting into and in grazing contact with the peripheries of said brushes, said plates sloping upwardly outwardly from their inner edges and the respective brushes so as to guide the toner upwardly along the plates upon rotation of the brushes, the rotations of the brushes in opposite directions causing dual circulatory flows of toner above the brushes with the first circulatory flow of toner being opposite the rotational direction of one of said brushes and the second circulatory flow of the toner being opposite the rotational direction of the other brushes as said plates coact with said brushes to induce dual circulatory flow of toner, the adjacent paths of said toner circulatory flows being downward whereby to induce a vortex flow of the toner and a bridging of toner is prevented and the toner flows at a steady rate from said outlet as said brushes rotate.

* * * * *